(12) United States Patent
Momchilov et al.

(10) Patent No.: US 11,703,957 B2
(45) Date of Patent: Jul. 18, 2023

(54) CONTROLLING FROM A MOBILE DEVICE A GRAPHICAL POINTER DISPLAYED AT A LOCAL COMPUTING DEVICE

(71) Applicant: CITRIX SYSTEMS, INC., Fort Lauderdale, FL (US)

(72) Inventors: Georgy Momchilov, Parkland, FL (US); Mukund Ingale, Pompano Beach, FL (US); Hao Chen, Nanjing (CN); Jacob Israel, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1134 days.

(21) Appl. No.: 16/340,766

(22) PCT Filed: Mar. 13, 2019

(86) PCT No.: PCT/CN2019/077925
§ 371 (c)(1),
(2) Date: Apr. 10, 2019

(87) PCT Pub. No.: WO2020/181514
PCT Pub. Date: Sep. 17, 2020

(65) Prior Publication Data
US 2022/0413629 A1 Dec. 29, 2022

(51) Int. Cl.
*G06F 3/0346* (2013.01)
*G06F 3/038* (2013.01)
*G06F 3/14* (2006.01)
*G06F 9/455* (2018.01)

(52) U.S. Cl.
CPC ............ *G06F 3/0346* (2013.01); *G06F 3/038* (2013.01); *G06F 3/14* (2013.01); *G06F 9/45558* (2013.01); *G06F 2009/45595* (2013.01); *G06F 2203/0384* (2013.01)

(58) Field of Classification Search
CPC ................. G06F 3/0346; G06F 1/1626; G06F 2200/1637; G06F 3/033
USPC .................................................. 345/163, 169
See application file for complete search history.

(56) References Cited

U.S. PATENT DOCUMENTS

| 6,847,351 | B2 | 1/2005 | Noguera | |
| 7,102,616 | B1* | 9/2006 | Sleator | G06F 3/0346 |
| | | | | 345/157 |
| 7,683,883 | B2* | 3/2010 | Touma | G06F 3/017 |
| | | | | 345/157 |
| 8,325,151 | B1 | 12/2012 | Chan et al. | |
| 8,982,048 | B2* | 3/2015 | Kabasawa | G06F 3/0383 |
| | | | | 345/157 |

(Continued)

FOREIGN PATENT DOCUMENTS

WO 2017/139509 8/2017

*Primary Examiner* — Koosha Sharifi-Tafreshi

(57) ABSTRACT

A computing system includes a mobile device having a wireless transceiver and an orientation sensor that senses orientation of the mobile device and generates orientation data based on the sensed orientation. A controller converts the orientation data to graphical pointer data, which is transmitted via the wireless transceiver to a local computing device, which translates the graphical pointer data to represent a graphical pointer being displayed on its display. The graphical pointer is controlled on the display of the local computing device by changing orientation of the mobile device.

18 Claims, 9 Drawing Sheets

(56) References Cited

U.S. PATENT DOCUMENTS

| | | | |
|---|---|---|---|
| 9,176,744 B2 | 11/2015 | Lee | |
| 9,538,345 B2 | 1/2017 | Sah et al. | |
| 10,192,335 B1 | 1/2019 | Wellen | |
| 2003/0058227 A1* | 3/2003 | Hara | G06F 3/04883 345/178 |
| 2004/0095317 A1* | 5/2004 | Zhang | G06F 3/0346 345/158 |
| 2006/0143571 A1* | 6/2006 | Chan | G06F 3/038 715/764 |
| 2007/0293261 A1 | 12/2007 | Chung | |
| 2009/0102836 A1* | 4/2009 | Cha | G06F 3/0354 345/419 |
| 2009/0115724 A1* | 5/2009 | Yamamoto | G06F 3/0346 345/158 |
| 2010/0013812 A1* | 1/2010 | Gu | G06F 3/014 345/207 |
| 2011/0119638 A1* | 5/2011 | Forutanpour | G06F 3/0386 715/863 |
| 2013/0055143 A1 | 2/2013 | Martin et al. | |
| 2013/0113993 A1 | 5/2013 | Dagit, III | |
| 2017/0336883 A1 | 11/2017 | Pavlou et al. | |
| 2017/0336884 A1 | 11/2017 | Pavlou et al. | |

\* cited by examiner

CONTROLLING FROM A MOBILE DEVICE A GRAPHICAL POINTER DISPLAYED AT A LOCAL COMPUTING DEVICE

BACKGROUND

Traditionally, personal computers include combinations of operating systems, applications, and user settings, which are each managed individually by owners or administrators on an ongoing basis. However, many organizations are now using desktop virtualization to provide a more flexible option to address the varying needs of their users.

In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

It is common in some cases for a user working remotely in communication with a virtualization server to cast the screen to a larger display. For example, the user may present contents displayed on the mobile device to an audience by transmitting graphics data from the mobile device to either a monitor having a controller configured to work with a wireless graphics transmission protocol on the mobile device, or a networked computer and monitor that interacts with the mobile device using a pre-defined protocol. The user may control a moving pointer on the screen, in an example, by employing a laser pointer pen to project a light spot on the screen.

A laser pointer is convenient to control, but has several disadvantages. These disadvantages include the additional cost, power limitations, hazard to human eyes, beam blockage created when a person walks between the screen and the laser pointer, minimal graphics effects, the difficulty in controlling the pointer pen when there is a small angle between the laser pointer and the screen, and the lack of visibility to remote attendees when using a video conference software to view the screen.

SUMMARY

A computing system includes a mobile device having a wireless transceiver and an orientation sensor configured to sense orientation of the mobile device and generate orientation data based on the sensed orientation. A controller is coupled to the wireless transceiver and the orientation sensor, and configured to convert the generated orientation data to graphical pointer data, and transmit the graphical pointer data via the wireless transceiver. A local computing device includes a display and a wireless transceiver configured to receive the graphical pointer data. A controller is coupled to the wireless transceiver and the display, and configured to translate the graphical pointer data to represent a graphical pointer being displayed on the display. The graphical pointer is controlled by changing orientation of the mobile device. The orientation sensor may include at least one of a gyroscope and an acceleration sensor.

A virtualization server may be configured to run virtual machine sessions and provide at least one hosted application during the virtual machine sessions. The client mobile device may be configured to access the at least one hosted application during one of the virtual machine sessions with the virtualization server, render graphical data from the at least one hosted application, and transmit the graphical data to the local computing device for display on the display.

In another example, the virtualization server may be configured to run virtual machine sessions and provide at least one hosted application during the virtual machine sessions. The local computing device may be configured to access the at least one hosted application during one of the virtual machine sessions with the virtualization server and render graphical data from the at least one hosted application for display on the display.

The controller at the mobile device may include at least one of a Mobile Application Management (MAM) framework and a Mobile Device Management (MDM) framework, and wherein the controller at the mobile device may be further configured to manage at least one native application executing on the mobile device, capture graphical data from the at least one native application, and transmit the graphical data to the local computing device for display on the display.

The local computing device may be a white board projector. The controller at the mobile device may be further configured to calibrate the orientation of the mobile device relative to the position of the graphical pointer displayed on the display. A default position of the graphical pointer may be centered within the display. The calibration at the mobile device may account for non-rectangular and rectangular displays. The calibration at the mobile device may be further performed utilizing a camera of the mobile device.

The orientation data may include angular data about the detected movement of the mobile device, and wherein the controller is configured to convert the angular data to graphical pointer data that includes corresponding X-Y coordinates of the graphical pointer displayed on the display. The vertical movement of the mobile device may correspond to Y movement of the graphical pointer on the display, and horizontal movement of the mobile device corresponding to X movement of the graphical pointer on the display. The local computing device may be configured to render a three-dimensional display environment, and wherein rotational movement of the mobile device corresponds to a Z movement of the graphical pointer on the display.

Another aspect is directed to a method of controlling from a mobile device a graphical pointer displayed at a local computing device. The mobile device includes a wireless transceiver, orientation sensor and controller coupled to the wireless transceiver and orientation sensor. The method includes generating orientation data at the orientation sensor based on the sensed orientation of the orientation sensor, converting the generated orientation data within the controller to graphical pointer data, transmitting the graphical pointer data from the mobile device via its wireless transceiver to a local computing device for display as a graphical pointer, and controlling the graphical pointer by changing orientation of the mobile device.

Yet another aspect is directed to a non-transitory computer readable medium for operating a mobile device and controlling from the mobile device a graphical pointer displayed at a local computing device as described above, and with the non-transitory computer readable medium having a plurality of computer executable instructions for causing the mobile device to perform steps as described above.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As will be discussed in greater detail below, an orientation sensor in a mobile device senses orientation and generates orientation data. The mobile phone's controller converts the orientation data to graphical pointer data, which is transmitted via a wireless transceiver to a local computing device. A controller at the local computing device translates the graphical pointer data to display a graphical pointer, which is controlled by changing orientation of the mobile device. A virtualization server may run virtual machine sessions and provide at least one hosted application, which may be accessed by either the mobile device or the local computing device.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
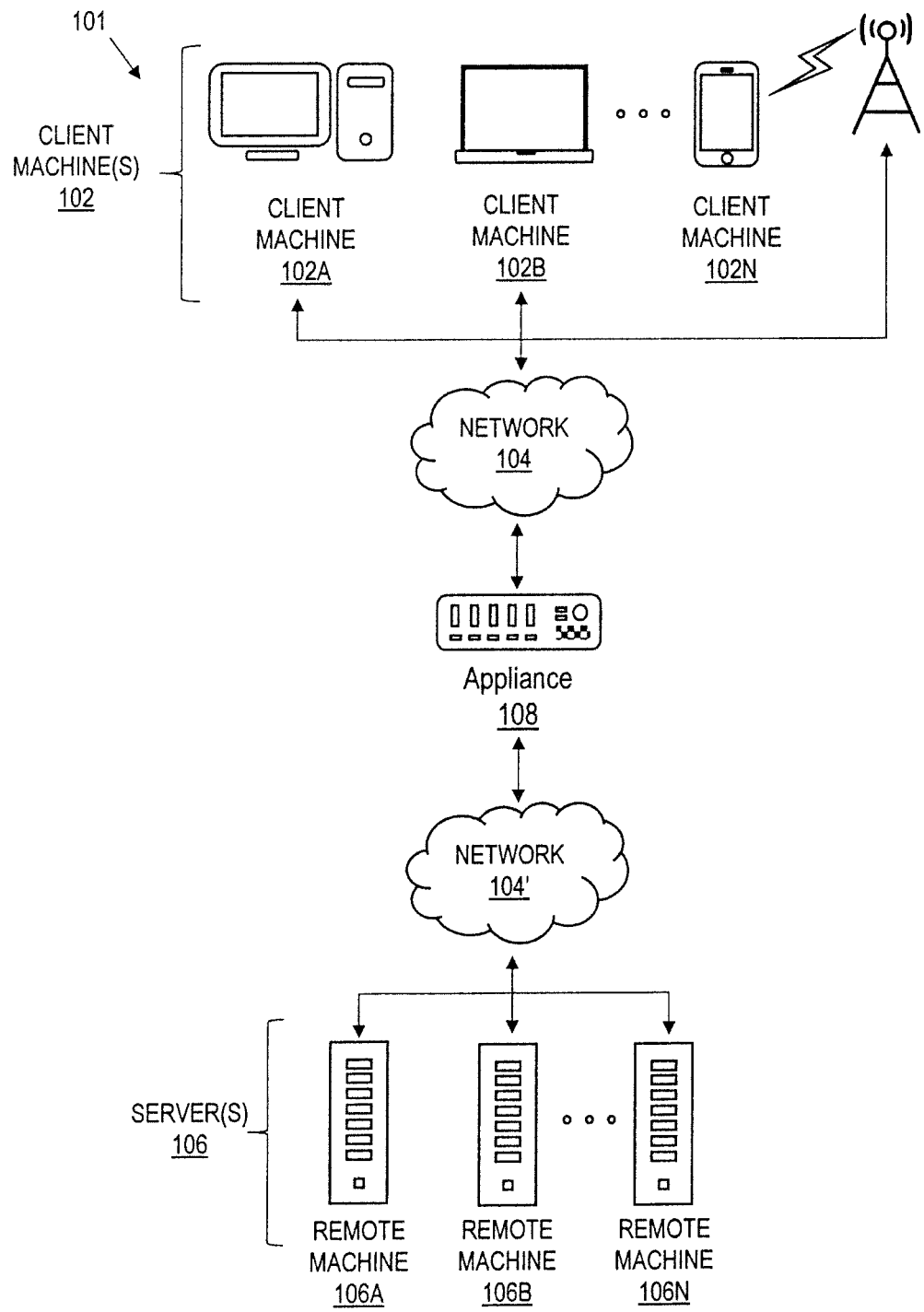
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
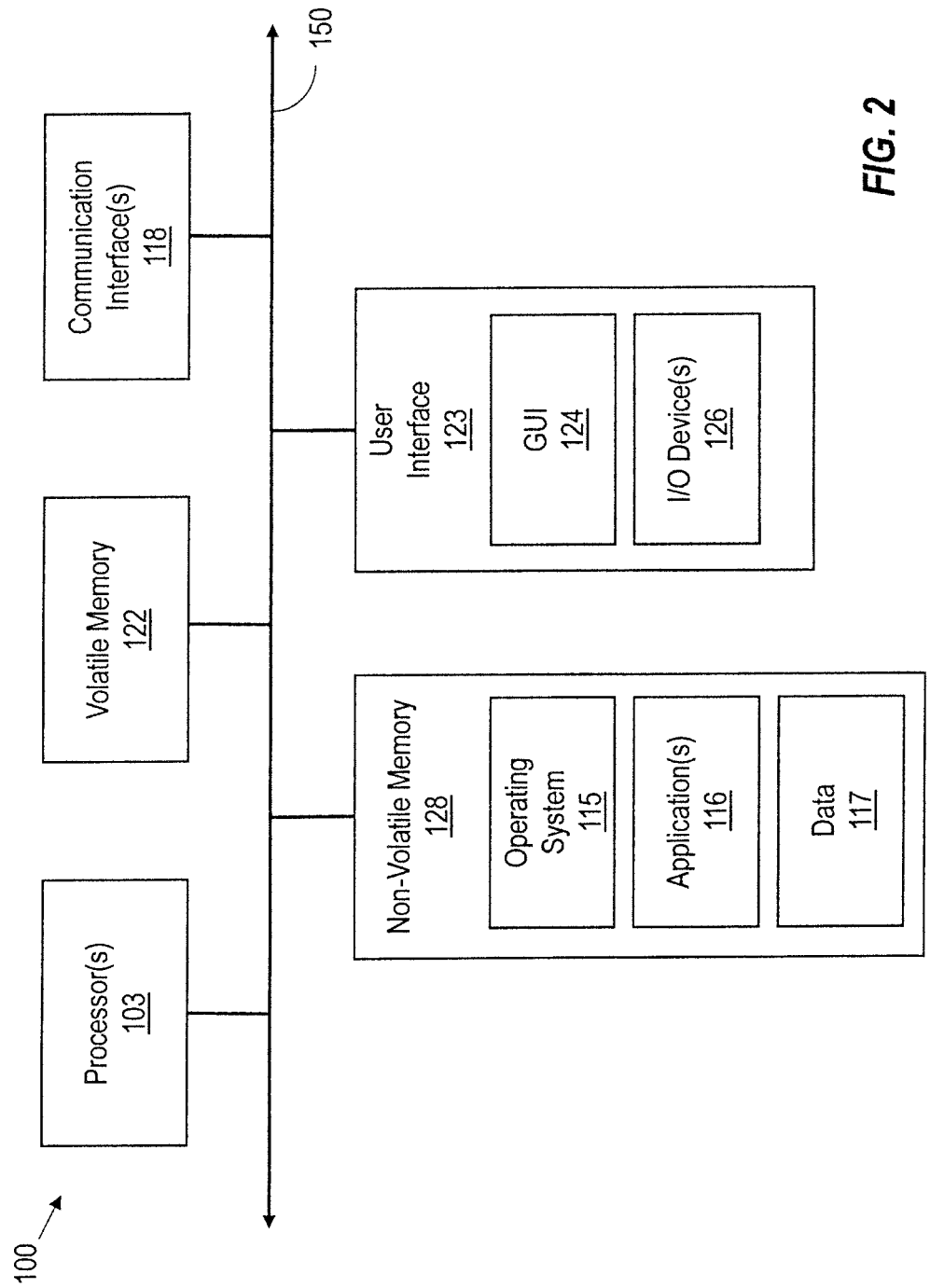
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

In accordance with a non-limiting example, there is now described the improvement in screen casting from a mobile device when the mobile device is equipped with an orientation sensor, for example, a gyroscope or acceleration sensor. The mobile device's controller captures the device orientation updates and maps the angles to X-Y positions on the cast screen as displayed and controls movement of the mouse pointer or a stand-alone graphical pointer. This graphical data could also originate from a virtual application such as the Citrix Systems' virtual app HDX, an enlightened mobile application such as Citrix Systems' MDX app, or a Citrix Workspace App application local User Interface that highlights a physical white board via a projector. This screen casting computer system eliminates the requirement for a physical mouse or a laser pointer pen and handles tilted or parallelogramical screens.

Figure 3:
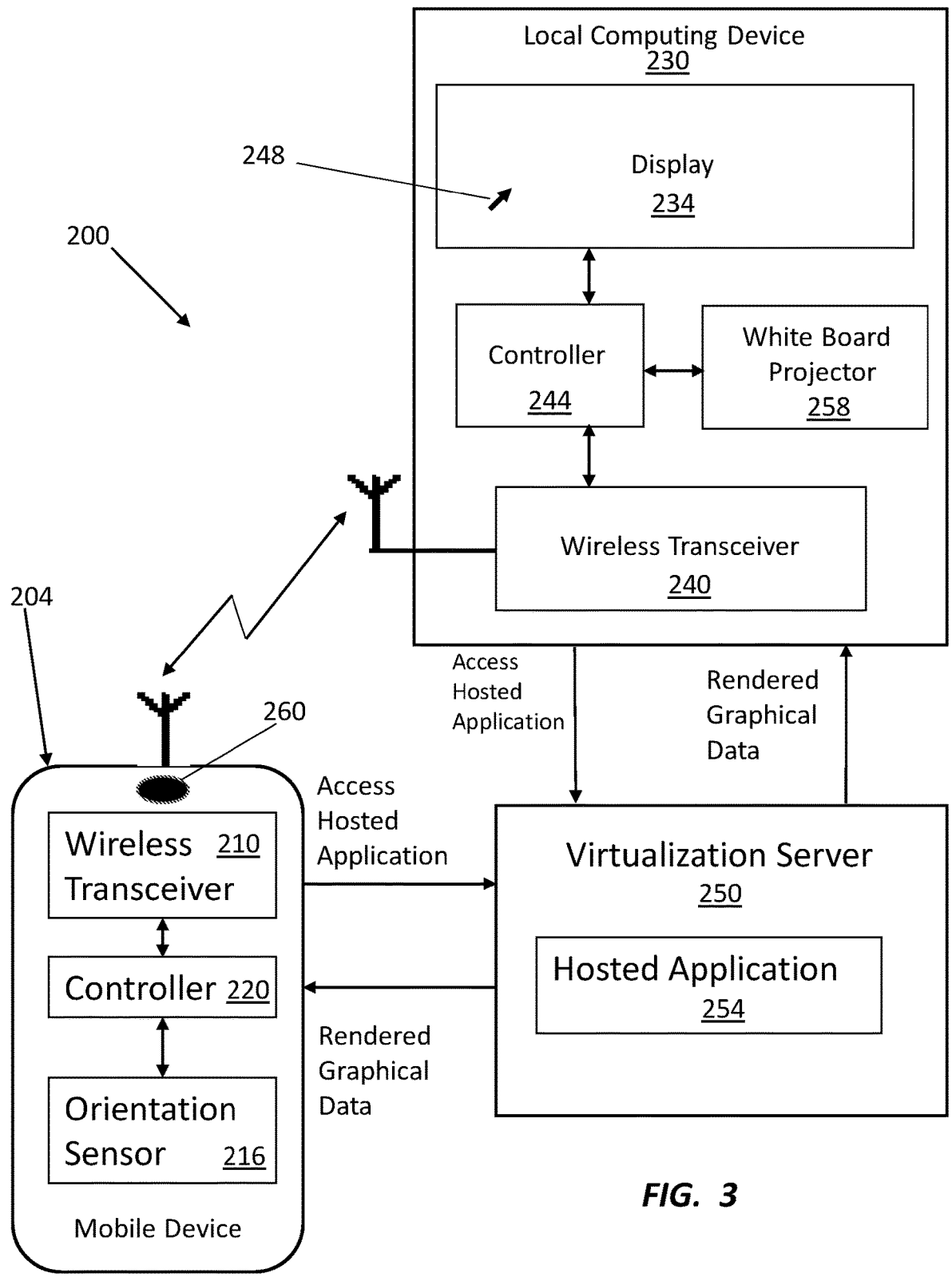
FIG. 3 is a block diagram of a computing system having a graphical pointer displayed at a local computing device and controlled by a mobile device and showing the virtualization server that may render graphical data.

Referring initially to FIG. 3, a computing system is illustrated generally at 200 and includes a client mobile device 204 operated by a user who may be operating remotely or locally. The mobile device 204 includes a wireless transceiver 210 and an orientation sensor 216 configured to sense orientation of the mobile device and generate orientation data based on that sensed orientation. A controller 220 is coupled to both the wireless transceiver 210 and the orientation sensor 216 and configured to convert the generated orientation data to graphical pointer data and transmit that graphical pointer data via the wireless transceiver 210 over a wireless communications signal to a local computing device, which includes a display 234 and a wireless transceiver 240 configured to receive the graphical pointer data. A controller 244 is coupled to the wireless transceiver 240 and the display 234 and is configured to translate the received graphical pointer data to represent a graphical pointer 248 that is displayed on the display. The graphical pointer 248 is controlled by changing orientation of the mobile device 204. In an example, the orientation sensor 216 at the mobile device 204 can be a gyroscope or an acceleration sensor, or a combination of both.

As illustrated, a virtualization server 250 is configured to run virtual machine sessions and provide at least one hosted application 254 during the virtual machine sessions. In an example, the virtualization server 250 may communicate with the mobile device 204, the local computing device 230, or both. In one aspect, the mobile device 204 is configured to access the at least one hosted application 254 during one of the virtual machine sessions with the virtualization server 250, which in turn, renders graphical data from the at least one hosted application 254 to the mobile device 204. The mobile device 204 may transmit the graphical data to the local computing device 230 for display. During a remote session, the graphical data is translated at the local computing device 230 to display the graphical pointer 248, and by changing orientation of the mobile device 204, the movement or orientation of the graphical pointer 248 on the display 234 may be controlled. Other graphical data may be displayed. In yet another aspect, the local computing device 230 is configured to access the at least one hosted application 254 at the virtualization server 250 during one of the virtual machine sessions and render graphical data from the at least one hosted application 254 to display graphics, text or other data on the display 234.

The controller 220 at the mobile device 204 may include at least one of a mobile application management (MAM) framework and a mobile device management (MDM) framework. The controller 220 may be configured to manage at least one native application executing on the mobile device 204 and capture graphical data from the at least one native application, and then transmit that graphical data to the local computing device 230 for display. In another example, the local computing device 230 may include a white board projector 258, including a smart board that connects to a local or remote computer and works with a projector.

Calibrating the mobile device 204 to display correctly the graphical pointer 248 is usually desired and the controller 220 at the mobile device 204 is further configured to calibrate the orientation of the mobile device relative to the position of the graphical pointer 248 displayed on the display. In an example, a default position of the graphical pointer 248 could be centered within the display 234, and the calibration at the mobile device 204 may account for both non-rectangular and rectangular displays. It is also possible to use a camera 260 on the mobile device during the calibration procedure by capturing imagery during different phases of the calibration procedure and processing the image data to aid the calibration procedure.

The orientation data is generated based on the sensed orientation of the mobile device 204, and the controller 220 converts the generated orientation data to graphical pointer data, which is then transmitted via the wireless transceiver 210 to the local computing device 230 for display as the graphical pointer 248. The orientation data may include angular data about the detected movement of the mobile device 204. The controller 220 may be configured to convert the angular data to graphical pointer data that includes corresponding X-Y coordinates of the graphical pointer 248 displayed at the display 234. The vertical movement of the mobile device 204 may correspond to Y movement of the graphical pointer 248 on the display 234, and horizontal movement of the mobile device may correspond to X movement of the graphical pointer 248 on the display. The local computing device 230 may be configured to render a three-dimensional display environment. In an example, the rotational movement of the mobile device 204 may correspond to a Z movement of the graphical pointer 248 on the display 234. As such, the systems and method set forth herein advantageously provide improved performance either as a stand-alone computing system 200 for casting a screen on the display 234 or within a virtualized and/or enterprise computing environment when the mobile device 204 casts an application to a local computing device 230 that includes the display 234, which could be a white board in an example.

Figure 4:
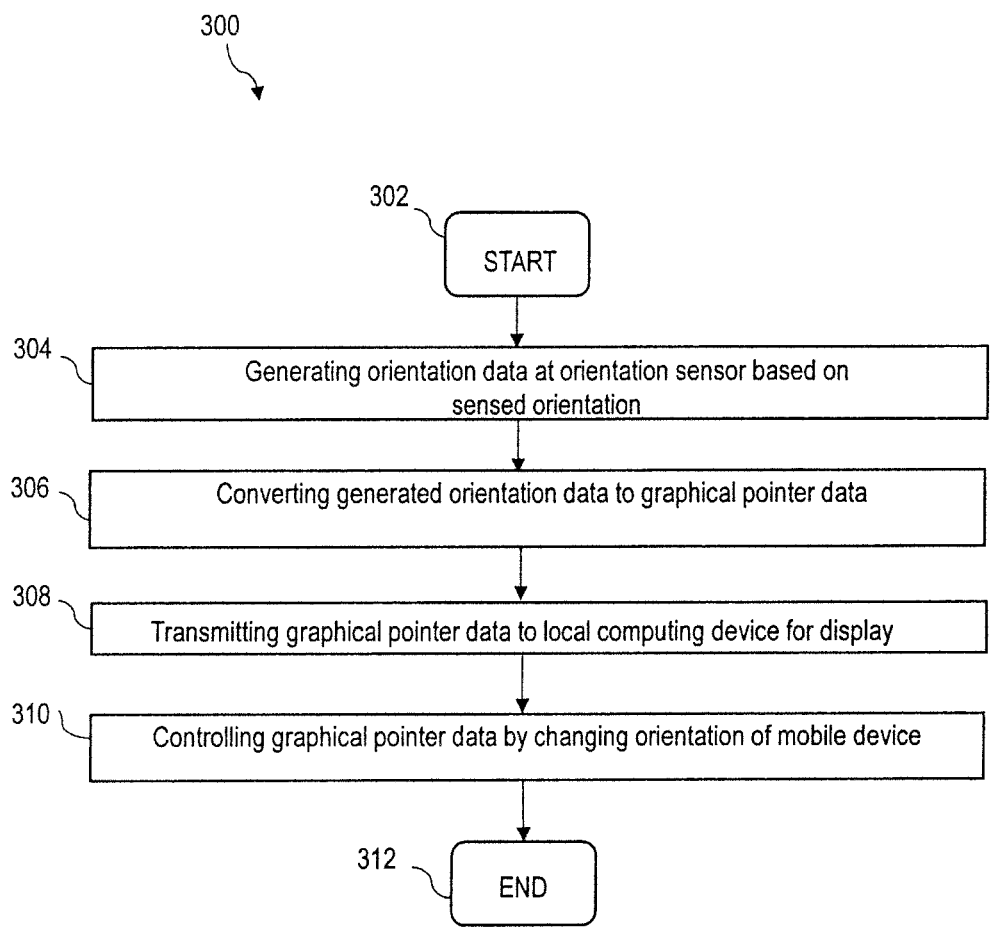
FIG. 4 is a flowchart illustrating a method for operating the mobile device illustrated in FIG. 3 to display and control the graphical pointer at the local computing device.

Referring now to the flowchart in FIG. 4, and generally speaking, a method of controlling from a mobile device 204 a graphical pointer displayed at a local computing device 230 is illustrated at 300. In this example, the mobile device 204 as described above includes the wireless transceiver 210, orientation sensor 216 and controller 220 coupled to both the wireless transceiver and orientation sensor. The method starts (Block 302) and the method includes generating orientation data at the orientation sensor 216 based on its sensed orientation (Block 304). The method continues by converting the generated orientation data within the controller 220 to graphical pointer data (Block 306) and transmitting the graphical pointer data from the mobile device 204 via its wireless transceiver 210 to the local computing device 230 for display as a graphical pointer 248 (Block 308). The method further includes controlling the graphical pointer 248 by changing orientation of the mobile device 204 (Block 310). The method ends at Block 312.

The computing system 200 as described allows a user at their mobile device 204 to cast a screen to a larger display 234 for viewing by a larger audience, for example, and controlling the graphical pointer 248 via the user's mobile device. Content, including text or graphical data, may be rendered at the local computing device 230 with a monitor attached, while the mobile device 204 operates as an input device that interacts with the local computing device 230 using pre-defined protocols. The user controls the moving graphical pointer 248 on the screen of the display 234, for example, controlling a system mouse cursor as the graphical pointer to interact with graphical content or a specific image or highlight a specific position. The computing system 200 overcomes more traditional ways to achieve this function, which was to swipe or click on the touch screen of a mobile device, requiring the user to navigate away from the casted screen to the mobile device and operate with their fingers. The computing system 200 as described, on the other hand, brings the convenience of being able to point the mobile device 204 to the display or screen location directly and use the mobile device 204 orientation to control movement of the graphical pointer 248.

The computing system 200 as described operates as a screen casting system and has advantages over traditional techniques that use a laser pointer pen to project a light spot on the casted screen as a display, which is convenient to control, but has several drawbacks, including the additional cost, power drainage, the hazard to human eyes, the potential blocking by someone walking between the screen as the display and the laser pointer, and the lack of graphics effects. It can also be difficult to control the graphical pointer on the screen when the pointer pen and the screen as the display form a small angle. In certain cases, the screen cannot be seen by remote attendees using video conferencing software to view the screen.

The controller 220 at the mobile device 204 includes programming software that is configured to monitor the mobile device's orientation updates, which originate from the orientation sensor 216, which in a preferred embodiment as noted before is a gyroscope or acceleration sensor. It should be understood that other orientation sensor devices could be used to generate the orientation data. The controller 220 processes the orientation data in one example to upper layer applications as Euler angle values that include the yaw, pitch and roll by the driver and mobile device operating system (OS).

Figure 5:
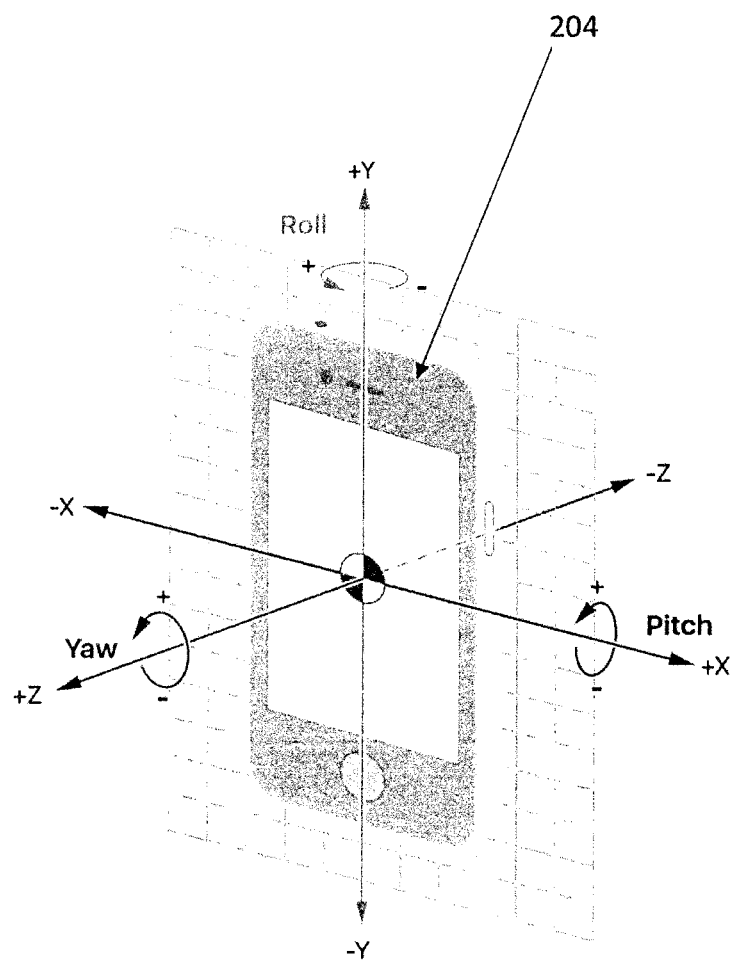
FIG. 5 is a diagrammatic view of the mobile device showing the different Euler angles of roll, pitch, and yaw for controlling the graphical pointer displayed at the local computing device.

An example mobile device 204 is shown diagrammatically in FIG. 5 and is casting the graphical pointer 248 onto the screen as a display 234 in order to illustrate the Euler angles and illustrates the pitch as the X-axis, the roll as the Y-axis, and the yaw as the Z-axis. Software for operating the controller 220 and orientation sensor 216 may be implemented as a stand-alone application, as part of the screen casting software of the mobile device 204, as a virtual application/desktop client, an MDX framework such as supplied by Citrix Systems, or a mobile operating system feature or similar software and driver components.

Figure 6A:
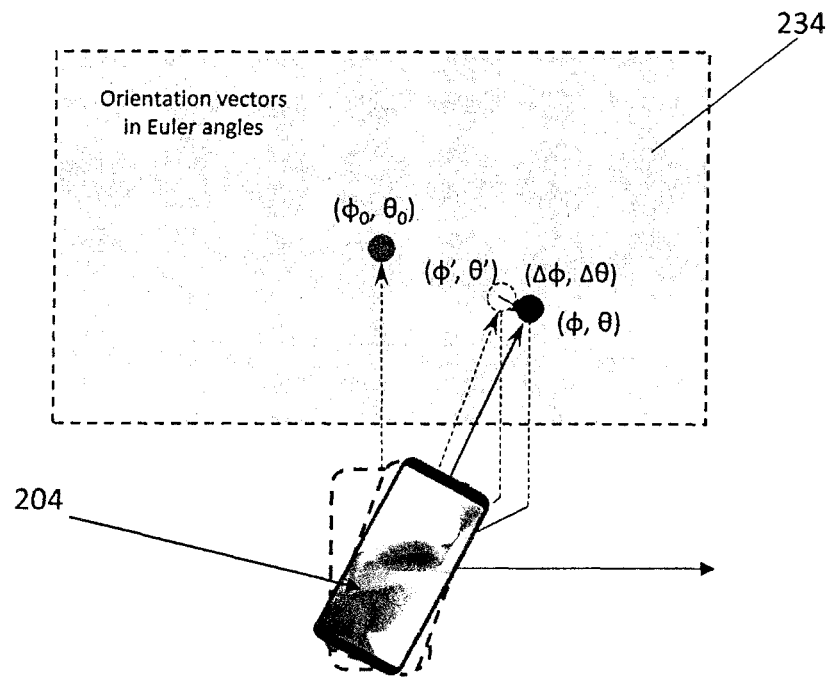
FIG. 6A is a diagrammatic view of the mobile device of FIG. 5 showing a rectangular display and the change in orientation vectors in Euler angles when changing orientation of the mobile device.
Figure 6B:
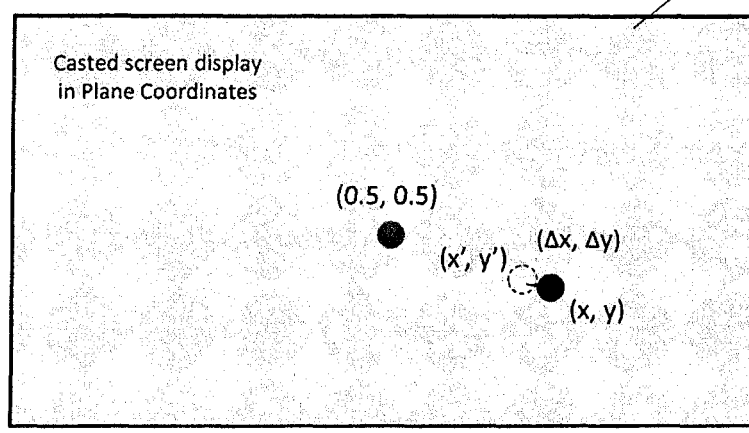
FIG. 6B is a diagrammatic view of the rectangular display of FIG. 6A showing angle-coordinate mapping and the change in plane coordinates when changing orientation of the mobile device.

Before a user may control accurately the graphical pointer 248 on the display 234, the user should initiate a calibration of the mobile device 204 during which the initial location of the graphical pointer may be by default centered on the screen. Calibration may occur via initial orientation of the mobile device with the necessary parameters depending on the algorithm used. These parameters are set and recorded by the controller 220 using its control software via the algorithms described below. During the entire screen casting session, once orientation data is received in real-time, the controller 220 performs a calculation using its control programming based on one of the algorithms as described below and maps the Euler angles to corresponding X-Y coordinates inside the display 234. The controller 220 then adjusts the graphical pointer 248 as displayed and renders a visual icon at the calculated position. If the cast screen on the display 234 is close to a perfect rectangle with horizontal and vertical edges, a simple calibration process and not a mapping algorithm as described below may be used. For example referring to FIGS. 6A and 6B, the angle-coordinate mapping on a rectangular screen as the display 234 is shown where the orientation vectors in Euler angles are illustrated in FIG. 6A as cast from the mobile device 204 and the casted screen as a display 234 in plane coordinates is shown in FIG. 6B.

In this non-limiting example of the calibration process and mapping algorithm, a velocity value v is configured by the controller software to represent the sensitivity of movement control. When v is higher, the X-Y coordinate value changes faster according to the Euler angles. During calibration, a highlighted point is displayed at the center of the display 234 as the casted screen, e.g., (960, 540) for a 1920×1080 screen resolution. The user is prompted to hold the mobile device 204 toward the highlighted spot as the starting orientation. The user interacts with the mobile device 204 controller software to indicate that the mobile device is ready. The graphical pointer 248 is then placed at the center position of the screen as the display 234.

During screen casting on the display 234, at a system defined pointer update interval, functions may be repeated as necessary. For example, the current Euler angles (yaw, pitch, roll) as detected by the mobile device 204 as a vector ($\varphi$, $\theta$, $\psi$) are saved. The delta to the last saved Euler angles is calculated. In this example, the roll angle ($\psi$) may be omitted because it does not change the direction pointed to by the top of the mobile device 204: ($\Delta\varphi$, $\Delta\theta$)=($\varphi$, $\theta$)−($\varphi'$, $\theta'$). The delta to be applied to the pointer coordinates is calculated: ($\Delta X$, $\Delta Y$)=v·($\Delta\varphi$, $\Delta\theta$). The delta to the last saved pointer coordinates is applied: (X, Y)=(X', Y')+($\Delta X$, $\Delta Y$). The pointer position is adjusted to (X, Y) and the new Euler angles and pointer coordinates as last values are saved: ($\varphi'$, $\theta'$, $\psi'$)=($\varphi$, $\theta$, $\psi$) and (X', Y')=(X, Y).

Figure 7A:
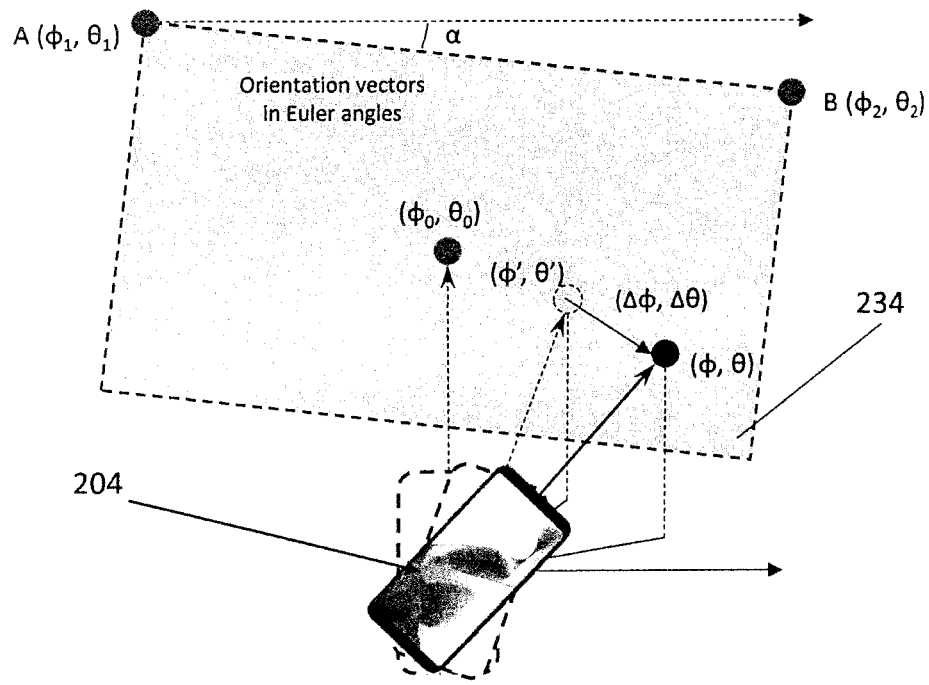
FIG. 7A is a diagrammatic view similar to that of FIG. 6A and showing a tilted rectangular display and the change in orientation vectors in Euler angles when changing orientation of the mobile device.
Figure 7B:
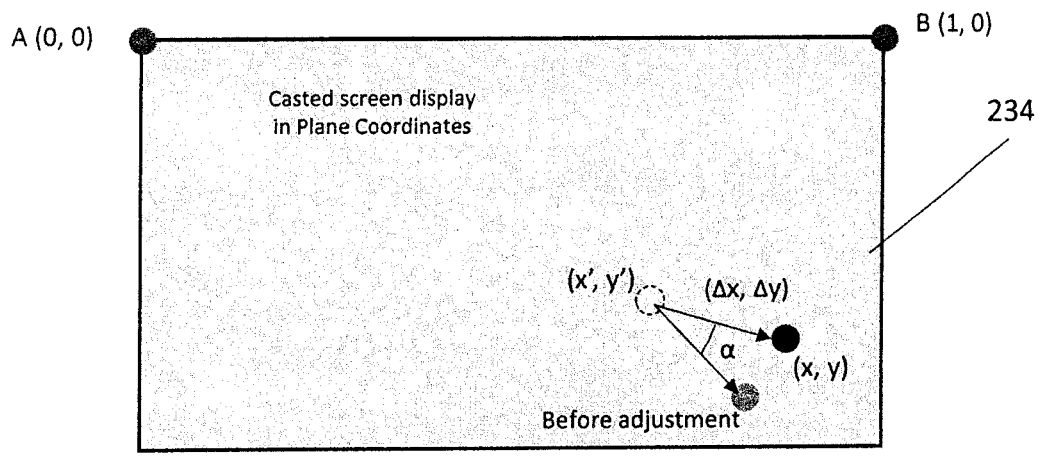
FIG. 7B is a diagrammatic view of the tilted rectangular display of FIG. 7A showing angle-coordinate mapping and the change in plane coordinates when changing orientation of the mobile device.

In many real-life cases, the cast screen on the display 234 is tilted because a projector is placed in a position where the casted screen is not straight. In this example, both the velocity and the angular adjustment have to be taken into account. The calibration process and mapping algorithm are thus adjusted as shown in the examples of FIGS. 7A and 7B showing diagrammatically the cast screen on the display 234. The orientation vectors in Euler angles are illustrated in FIG. 7A. The mobile device 204 is moved as necessary, and in this example of FIG. 7A, tilted and moved to the right. The cast screen at the display 234 in plane coordinates is illustrated in FIG. 7B with the position before adjustment and the illustrated angle and points (X',Y') and (Y,Y) and $\Delta X$, $\Delta Y$).

A velocity value v is configured by the controller 220 using its controller programming to represent the sensitivity of movement control. When v is higher, the X-Y coordinate value changes faster according to the Euler angles. During calibration, a highlight point is displayed at the top-left corner of the cast screen, e.g., coordinate (0, 0) for a 1920×1080 screen resolution. The user is prompted to hold the mobile device 204 toward the highlighted spot as the starting orientation. The user interacts with the control program operated by the controller 220 to indicate that the mobile device 204 has been targeted to the spot. The controller 220 programming records the current Euler angle of the mobile device 204 as ($\varphi_1$, $\theta_1$, $\psi_1$), These steps are repeated for the top-right corner, e.g., (1920, 0) position for a 1920×1080 screen resolution, and the controller 220 records the Euler angle of the mobile device 204 as ($\varphi_2$, $\theta_2$, $\psi_2$). The controller 220 calculates and saves the adjustment angle:

$$\alpha = a\tan\left(\frac{\theta_2 - \theta_1}{\varphi_2 - \varphi_1}\right)$$

During screen casting on the display 234, at a system defined graphical pointer update interval, various functions are repeated to ensure for optimized function and screen casting accuracy and user experience. The current Euler angles (yaw, pitch, roll) detected by the mobile device 204 as the vector ($\varphi$, $\theta$, $\psi$) are saved. Practically, the initial Euler angles could be those at the last calibration point, i.e., ($\varphi_2$, $\theta_2$, $\psi_2$). The delta is calculated to the last saved Euler angles. In this example, the roll angle ($\psi$) is omitted because it does not change the direction pointed to by the top of the mobile device 204: ($\Delta\varphi$, $\Delta\theta$)=($\varphi$, $\theta$)−($\varphi'$, $\theta'$). The delta to be applied to the graphical pointer 248 coordinates is calculated by applying the adjustment angle:

$$\beta = a\tan\left(\frac{\Delta\theta}{\Delta\varphi}\right) - \alpha;$$

and $$(\Delta X, \Delta Y) = v \cdot (\cos\beta, \sin\beta).$$

The delta to the last saved graphical pointer coordinates is applied: (X, Y)=(X', Y')+($\Delta X$, $\Delta Y$). The graphical pointer position is adjusted to (X, Y); and the new Euler angles and graphical pointer coordinates as last values calculated:

($\varphi'$,$\theta'$,$\psi'$)=($\varphi$,$\theta$,$\psi$) and (X',Y')=(X,Y).

In some real-life examples, the cast screen on the display 234 is non-rectangular due to the placement of a projector or the relative position between a projector and the screen canvas as the display. The display 234 may end up very close to an arbitrary quadrilateral shape such as displayed on a plain canvas. In that example, a more complex calibration process and mapping algorithm may be used.

Figure 8A:
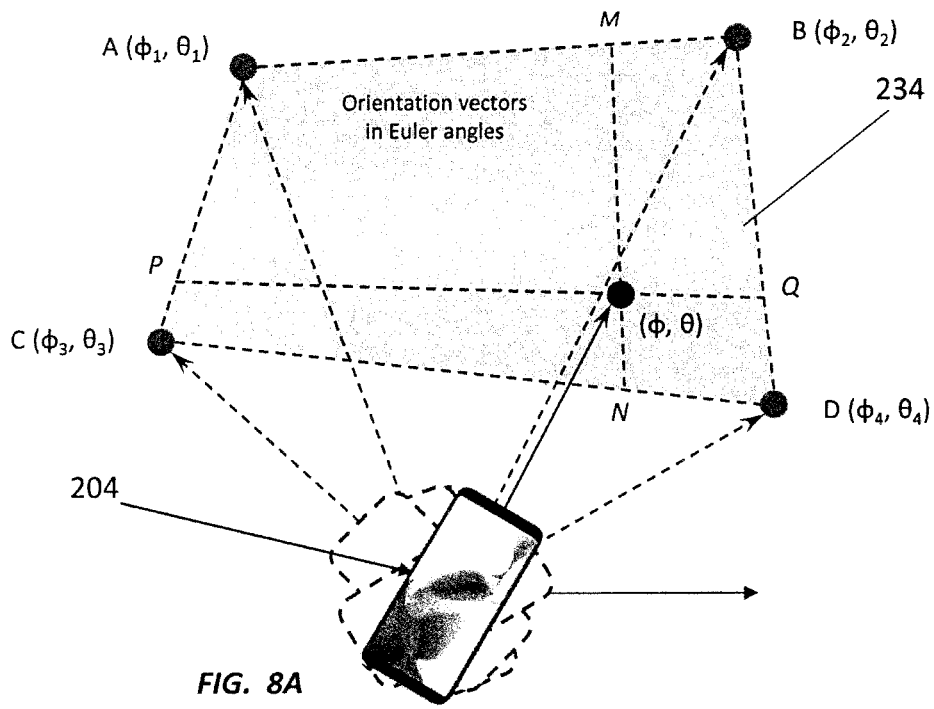
FIG. 8A is a diagrammatic view similar to that of FIGS. 6A and 7A and showing an arbitrary quadrilateral display and the change in orientation vectors in Euler angles when changing orientation of the mobile device.
Figure 8B:
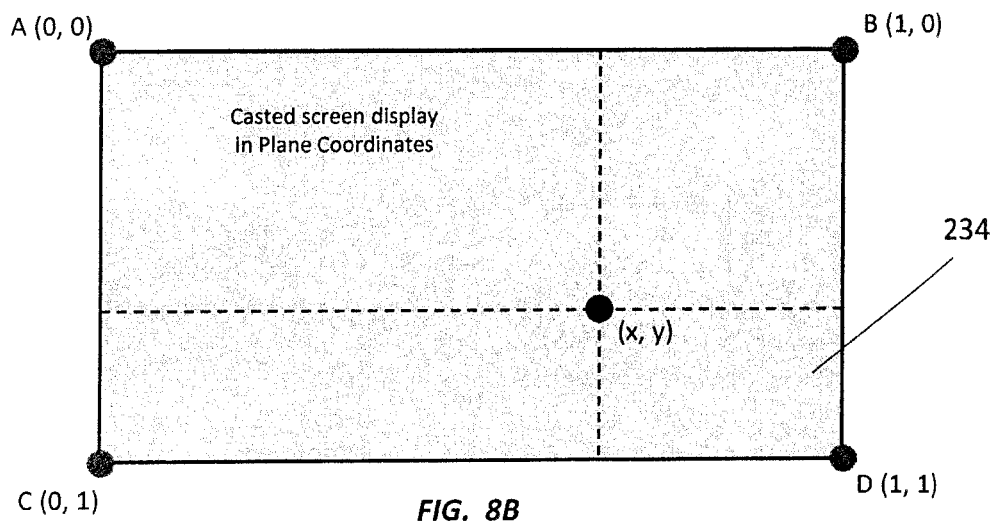
FIG. 8B is a diagrammatic view of the arbitrary quadrilateral display of FIG. 8A showing angle-coordinate mapping and the change in plane coordinates when changing orientation of the mobile device.

Referring now to FIGS. 8A and 8B, there are illustrated the angle-coordinate mapping on an arbitrary quadrilateral screen on the display 234, where FIG. 8A shows the mobile device 204 and the orientation vector in Euler angles, and FIG. 8B shows the cast screen on the display in plane coordinates. During calibration, a highlight point is displayed at the top-left corner, e.g. (0, 0) position, of the display 234. The user is prompted to hold the mobile device 204 toward the highlighted spot. The user interacts with the control program in the controller 220 by appropriate manual activation, for example, to indicate that the mobile device 204 has been targeted to the spot. The control program of the controller 220 records the current Euler angle of the mobile device 204 as ($\varphi_1$, $\theta_1$, $\psi_1$). This is repeated for the top-right corner, e.g., (1920, 0) position for a 1920×1080 screen resolution, and the Euler angle of the mobile device 204 is recorded as ($\varphi_2$, $\theta_2$, $\varphi_2$). The process is again repeated for the bottom-left corner, e.g., (0, 1080) position for a 1920×1080 screen resolution, and the Euler angle of the mobile device 204 recorded as ($\varphi_3$, $\theta_3$, $\psi_3$). The process is yet again repeated for the same for the bottom-right corner, e.g., (1920, 1080) position for a 1920×1080 screen resolution, and the Euler angle of the mobile device 204 is recorded as ($\varphi_4$, $\theta_4$, $\psi_4$). These four points are anchor points referring to the points labeled A, B, C, D in FIGS. 8A and 8B.

During screen casting onto the display 234 at a system defined graphical pointer update interval, different functions may be repeated. The current Euler angles (yaw, pitch, roll) detected by the mobile device 204 as vector ($\varphi$, $\theta$, $\psi$) are saved. Practically, the initial Euler angles could be those at the last calibration point, i.e., ($\psi_4$, $\theta_4$, $\psi_4$). The following constants may be calculated:

$$a = \begin{vmatrix} \varphi_2 - \varphi_1 & \varphi_4 - \varphi_3 \\ \theta_2 - \theta_1 & \theta_4 - \theta_3 \end{vmatrix}$$

$$b = \begin{vmatrix} \varphi_2 - \varphi_1 & \varphi - \varphi_3 \\ \theta_2 - \theta_1 & \theta - \theta_3 \end{vmatrix} + \begin{vmatrix} \varphi - \varphi_1 & \varphi_4 - \varphi_3 \\ \theta - \theta_1 & \theta_4 - \theta_3 \end{vmatrix}$$

$$c = \begin{vmatrix} \varphi - \varphi_1 & \varphi - \varphi_3 \\ \theta - \theta_1 & \theta - \theta_3 \end{vmatrix}$$

$$d = \begin{vmatrix} \varphi_3 - \varphi_1 & \varphi_4 - \varphi_2 \\ \theta_3 - \theta_1 & \theta_4 - \theta_2 \end{vmatrix}$$

$$e = \begin{vmatrix} \varphi_3 - \varphi_1 & \varphi - \varphi_2 \\ \theta_3 - \theta_1 & \theta - \theta_2 \end{vmatrix} + \begin{vmatrix} \varphi - \varphi_1 & \varphi_4 - \varphi_2 \\ \theta - \theta_1 & \theta_4 - \theta_2 \end{vmatrix}$$

$$f = \begin{vmatrix} \varphi - \varphi_1 & \varphi - \varphi_2 \\ \theta - \theta_1 & \theta - \theta_2 \end{vmatrix}$$

The relative X-Y coordinate values are calculated as:

$$X = \frac{\sqrt{b^2 - 4ac} - b}{2a}$$

$$Y = \frac{\sqrt{e^2 - 4df} - e}{2d}$$

The graphical pointer 248 position is adjusted relative to (X, Y). In the example where the display 234 has 1920×1080 resolution, the actual pixel coordinates are (1920X, 1080Y). The algorithm described above provides advantages that help obtain a positive user experience. When the user moves the mobile device 204 in a straight line between two points, it is expected that the plane coordinates of the graphical pointer 248 of the display 234 change linearly with the Euler angles of the mobile device 204 so that the user feels the best experience. In an example, the relative mouse position to be calculated is (x,y). If a linear division over the four edges of the cast screen rectangle on the display 234 using factor x and y is accomplished, the four points M, N, P, Q as shown in FIG. 8A are obtained. If the same linear division on the "virtual edge" is formed by the calibrated Euler angles of the four anchor points A, B, C and D, the following proximate Yaw and Pitch angles are obtained:

[(1−x)$\varphi_1$+x$\varphi_2$,(1−x)$\theta_1$+x$\theta_2$]    M:

[(1−x)$\varphi_3$+x$\varphi_4$,(1−x)$\theta_3$+x$\theta_4$]    N:

[(1−y)$\varphi_1$+y$\varphi_3$,(1−y)$\theta_1$+y$\theta_3$]    P:

[(1−y)$\varphi_2$+y$\varphi_4$,(1−y)$\theta_2$+y$\theta_4$]    Q:

The lines MN and PQ are connected to form two "virtual lines." The current Euler angles ($\varphi$, $\theta$) should fall on their intersection point, that is, fall on both MN and PQ. Thus, the following equations derived from the two-point form of lines MN and PQ are true:

$$\frac{\varphi - [(1-x)\varphi_1 + x\varphi_2]}{\varphi - [(1-x)\varphi_3 + x\varphi_4]} = \frac{\theta - [(1-x)\theta_1 + x\theta_2]}{\theta - [(1-x)\theta_3 + x\theta_4]}$$

$$\frac{\varphi - [(1-y)\varphi_1 + y\varphi_3]}{\varphi - [(1-y)\varphi_2 + y\varphi_4]} = \frac{\theta - [(1-y)\theta_1 + y\theta_3]}{\theta - [(1-y)\theta_2 + y\theta_4]}$$

These equations can be transformed and simplified as:

$ax^2+bx+c=0$ $dy^2+ey+f=0$, where a, b, c, d, e, f are constants defined in last section in determinant form. The quadratic equations above are then evaluated to obtain the x, y values.

Figure 9:
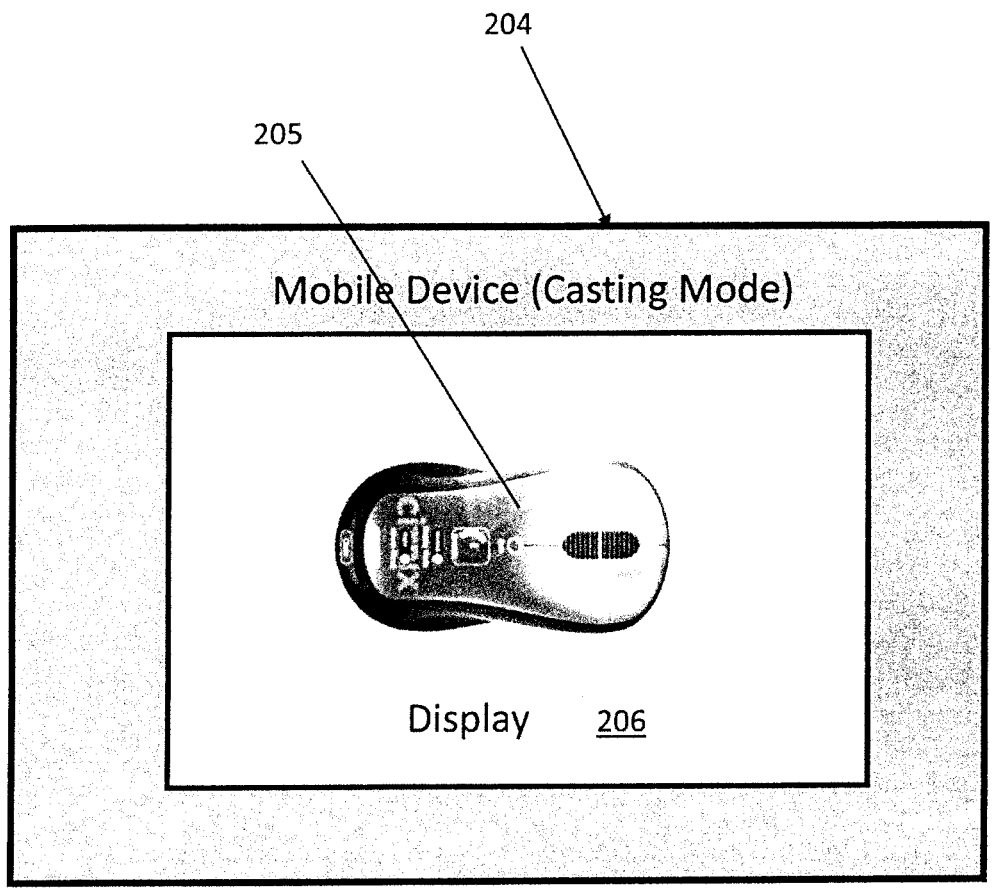
FIG. 9 is a block diagram of the mobile device showing a displayed mouse indicative that the mobile device is in a casting mode to display the graphical pointer at the local computing device.

In a prototype as tested, an iPhone as the mobile device 204 was used that included an orientation sensor 216 as a gyrometer where the yaw and pitch events from the gyrometer were converted into X and Y coordinates with mapping to a screen display and using Citrix Systems' HDX session coordinates. The prototype included left, right and the scroll wheel as mouse buttons and a pointer centering and having sensitivity adjustment in a right-hand versus left-hand mouse. A display mode (FIG. 9) for the mobile device 204 shows a mouse image 205 on the display 206 in casting mode where the graphical pointer 218 is displayed. It is possible to have an HDX screen on the mobile device 204, as an example. The integration with the receiver application at the mobile device 204 may include a software application as AirPlay. The Citrix Systems' Receiver application becomes a graphical pointer 248, clicker and keyboard device. As potential features, it is possible to use image recognition, e.g., IOS AR Kit or Vuforia AR Kit to detect the external display as a screen, TV set, white board with projector or similar display device. It is also possible to determine the target coordinate system in case the casting system is not supported, for example, as in an old-school white board and projector.

It is possible to use the Citrix Systems' Workspace Hub to adopt the computing system 200 to enhance the user experience and control a mouse cursor or a visual graphical pointer in its casting session with roaming functionalities. With the algorithm as described, it can be applied to an enlightened mobile application, for example, an application managed by Citrix Systems MDX, and rendered to the external display 234. The gyro mouse inputs as received from the orientation server 216 can be injected into the mobile application as touch events, such as described in commonly assigned U.S. patent application Ser. No. 15/160,047 filed on May 20, 2016, and published as U.S. Patent Publication No. 2017/0336883, entitled "Using a Hardware Mouse to Operate a Local Application Running on a Mobile Device," and commonly assigned U.S. patent application Ser. No. 15/453,499 filed on Mar. 8, 2017, and published as U.S. Patent Publication No. 2017/0336884 entitled, "Controlling a Local Application Running on a User Device that Displays a Touch Screen Image on a Touch Screen via Mouse Input From External Electronic Equipment," the disclosures which are hereby incorporated by reference in their entirety.

In yet another example, the display 234 could be a physical white board and used along with a projector. Rather than casting collaboration graphical pointer content, the Citrix Systems' Workspace App (application) could use the projector to cast its local user interface as a solid color region, for example, an all-white rectangular region, while highlighting with a differently colored pointer a specific point in the content on the physical white board, for example, content drawn with a physical marker.

In a conference room as another example, the computing system 200 as described can be applied to a video conferencing system to control a graphical pointer 248 that is visible to all attendees. If the orientation of the mobile device 204 is used to control a visual icon, i.e., a software-rendered laser spot, it is possible to achieve richer dynamic graphics effects, including drawing lines, circles, blinking, color changing, image changing, and similar effects. It is also possible these effects could be controlled by various interactive techniques at the mobile device 204. For example, it is possible to press a finger on the screen while rotating the mobile device 204, resulting in a consecutive curve being rendered on the display 234. The calibration process as described may be further enhanced, for example, by using the camera 260 at the mobile device 204 to detect the screen area and automatically initialize the orientation vectors with it. The computing system 200 as described turns every mobile device 204 equipped with an orientation sensor 216 into a controller 220, so that users do not require any additional costs to purchase hardware. This computing system 200 as described can integrate seamlessly with screen casting from a mobile device 204, which is used for casting control and display graphical pointer controls simultaneously without the need to watch the screen of the display 234.

Referring again to FIG. 9, there is illustrated the mobile device 204 operative in a gyro mouse mode that is integrated with the Citrix Systems Receiver on the mobile device, in an example, for IOS. This gyro mouse prototype may be used with the Citrix Receiver for the IOS during screen casting of an HDX session to an external display 234. The display of an image of the mouse 205 on the mobile device display 206 indicates the mobile device is in a casting mode and operative as a gyro mouse.

It is also possible to work in a three-dimensional system such as Microsoft HoloLens or the Magic Leap program for 3D augmented reality objects and mapping to a 3D position. For example, rotating the mobile device 204 clockwise could cause a three-dimensional moving in, while rotating the mobile device counterclockwise could cause a three-dimensional moving out. It is also possible to view the computing system 200 as similar to a scrolling for clockwise and counterclockwise movement, going in and out in the 3D environment. Thus, by rotating the mobile device 204, it is possible to select the augmented reality objects. It is also possible to host the Citrix Systems Receiver that is connected to a remote VDA. Normally, it is possible to present the images of the remote application on the mobile device 204 such as a phone, for example. In another embodiment, the images of the remote application could be cast to an external monitor as a display 234 or other external device. It is possible to use the Citrix Systems Workspace Hub technology with an external monitor that not only may operate as a monitor, but could be, for example, a raspberry pi device that accepts display casting. The computing system 200 as described offers the advantage of projecting the mouse graphical pointer by using the orientation sensors in the mobile device and operative similar to controlling a laser pointer as integrated into an HDX session.

In another aspect, a non-transitory computer readable medium for operating a mobile device 204 and controlling from the mobile device a graphical pointer 248 displayed at a local computing device 230 is set forth. The mobile device 204 includes the wireless transceiver 210, orientation sensor 216 and the controller 220 coupled to the wireless transceiver and orientation sensor. The non-transitory computer readable medium has a plurality of computer executable instructions for causing the mobile device 204 to perform steps, including: generating orientation data at the orientation sensor 216 based on the sensed orientation of the orientation sensor, converting the generated orientation data within the controller 220 to graphical pointer data, transmitting the graphical pointer data via the wireless transceiver 210 to a local computing device 230 to display a graphical pointer 248, and controlling the graphical pointer 248 by changing orientation of the mobile device 204.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. A computing system comprising:
a mobile device comprising:
a wireless transceiver,
an orientation sensor configured to sense orientation of said mobile device, and to generate orientation data based on the sensed orientation, and
a controller coupled to said wireless transceiver and said orientation sensor, and configured to:
convert the generated orientation data to graphical pointer data, and
transmit the graphical pointer data via said wireless transceiver; and
a local computing device comprising:
a display,
a wireless transceiver configured to receive the graphical pointer data, and
a controller coupled to said wireless transceiver and said display, and configured to translate the graphical pointer data to represent a graphical pointer being displayed on said display, with the graphical pointer being controlled by changing orientation of said mobile device; and
a virtualization server configured to run virtual machine sessions and provide at least one hosted application during the virtual machine sessions, and wherein said mobile device is configured to:
access the at least one hosted application during one of the virtual machine sessions with said virtualization server,
render graphical data from the at least one hosted application, and
transmit the graphical data to said local computing device for display on said display.

2. The computing system according to claim 1 wherein said orientation sensor comprises at least one of a gyroscope and an acceleration sensor.

3. The computing system according to claim 1 further comprising a virtualization server configured to run virtual machine sessions and provide at least one hosted application during the virtual machine sessions, and wherein said local computing device is configured to:
access the at least one hosted application during one of the virtual machine sessions with said virtualization server, and
render graphical data from the at least one hosted application for display on said display.

4. The computing system according to claim 1 wherein said controller at said mobile device comprises at least one of a Mobile Application Management (MAM) framework and a Mobile Device Management (MDM) framework, and wherein said controller at said mobile device is further configured to:
manage at least one native application executing on said mobile device,
capture graphical data from the at least one native application, and
transmit the graphical data to said local computing device for display on said display.

5. The computing system according to claim 1 wherein said local computing device comprises a white board projector.

6. The computing system according to claim 1 wherein said controller at said mobile device is further configured to calibrate the orientation of said mobile device relative to the position of the graphical pointer displayed on said display.

7. The computing system according to claim 6 wherein a default position of the graphical pointer is centered within said display.

8. The computing system according to claim 6 wherein calibration at said mobile device accounts for non-rectangular and rectangular displays.

9. The computing system according to claim 6 wherein calibration at said mobile device is further performed utilizing a camera of said mobile device.

10. The computing system according to claim 1 wherein the orientation data includes angular data about the detected movement of said mobile device, and wherein said controller is configured to convert the angular data to graphical pointer data that includes corresponding X-Y coordinates of the graphical pointer displayed on said display.

11. The computing system according to claim 10 wherein vertical movement of said mobile device corresponds to Y movement of the graphical pointer on said display, and horizontal movement of said mobile device corresponds to X movement of the graphical pointer on said display.

12. The computing system according to claim 11 wherein said local computing device is configured to render a three-dimensional display environment, and wherein rotational movement of said mobile device corresponds to a Z movement of the graphical pointer on said display.

13. A method of controlling from a mobile device a graphical pointer displayed at a local computing device, the mobile device comprising a wireless transceiver, orientation sensor and controller coupled to the wireless transceiver and orientation sensor and the controller comprising at least one of a Mobile Application Management (MAM) framework and a Mobile Device Management (MDM) framework, the method comprising:
generating orientation data at the orientation sensor based on the sensed orientation of the orientation sensor;
converting the generated orientation data within the controller to graphical pointer data;
transmitting the graphical pointer data from the mobile device via its wireless transceiver to the local computing device for display as a graphical pointer;
controlling the graphical pointer by changing orientation of the mobile device;
managing at the mobile device at least one native application executing on the mobile device;
capturing graphical data from the at least one native application; and
transmitting the graphical data to a local computing device for display.

14. The method according to claim 13 wherein the orientation sensor comprises at least one of a gyroscope and an acceleration sensor.

15. The method according to claim 13 wherein the method includes calibrating the orientation of mobile device relative to the position of the graphical pointer displayed on the display.

16. The method according to claim 15 wherein the calibrating at the mobile device is further performed utilizing a camera of the mobile device.

17. The method according to claim 13 wherein the orientation data includes angular data about the detected movement of the mobile device, and the method comprises converting the angular data to graphical pointer data that includes corresponding X-Y coordinates of the graphical pointer displayed on the display.

18. A non-transitory computer readable medium for operating a mobile device and a virtualization server and controlling from the mobile device a graphical pointer displayed at a local computing device, the mobile device comprising a wireless transceiver, orientation sensor and controller coupled to the wireless transceiver and orientation sensor, and running from the virtualization server virtual machine sessions and provide at least one hosted application during the virtual machine sessions, and with the non-transitory computer readable medium having a plurality of computer executable instructions for causing the mobile device and virtualization server to perform steps comprising:

generating orientation data at the orientation sensor based on the sensed orientation of the orientation sensor;

converting the generated orientation data within the controller to graphical pointer data;

transmitting the graphical pointer data via the wireless transceiver to a local computing device to display a graphical pointer;

controlling the graphical pointer by changing orientation of the mobile device;

accessing the at least one hosted application during one of the virtual machine sessions with the virtualization server; and rendering graphical data from the at least one hosted application for display on the display.

\* \* \* \* \*